United States Patent [19]

Huber

[11] Patent Number: 5,476,894
[45] Date of Patent: Dec. 19, 1995

[54] COLOR PASTE FOR MANUFACTURING INTERNALLY PRINTED LAMINATED GLASS PANES

[75] Inventor: Adalbert Huber, Langen, Germany

[73] Assignee: Cerdec Aktiengesellshcaft Keramische Farben, Frankfurt, Germany

[21] Appl. No.: 334,240

[22] Filed: Nov. 4, 1994

[30] Foreign Application Priority Data

Nov. 5, 1993 [DE] Germany ............... 43 37 826.9

[51] Int. Cl.⁶ ............... C08K 5/08; C08K 5/13; C09D 5/00; C09D 11/00
[52] U.S. Cl. ............ 524/358; 524/324; 524/335; 524/345; 524/494; 106/1.05; 106/22 D; 106/313
[58] Field of Search ............ 524/324, 335, 524/345, 358, 494; 106/1.05, 22 D, 313

[56] References Cited

U.S. PATENT DOCUMENTS

| 4,374,696 | 2/1983 | Schmidt et al. ............ 428/429 |
| 4,929,493 | 5/1990 | Tünker ............ 428/428 |
| 5,212,212 | 5/1993 | Fonda ............ 524/400 |

FOREIGN PATENT DOCUMENTS

| 0535474 | 4/1993 | European Pat. Off. . |
| 62-72548 | 4/1987 | Japan . |

*Primary Examiner*—Tae H. Yoon
*Attorney, Agent, or Firm*—Wenderoth, Lind & Ponack

[57] ABSTRACT

The invention relates to an improved color paste for the manufacture of internally printed, curved laminated glass panes.

Prior art color pastes cause problems with respect to adhesion and optical accuracy or require a higher technical complexity during the baking process for producing internally printed laminated glass panes.

Color pastes which constitute the invention and overcome the previous drawbacks are characterized by a print medium which contains 5,6,8-trihydroxy-1,4-naphthoquinone in addition to solvents.

10 Claims, No Drawings

COLOR PASTE FOR MANUFACTURING INTERNALLY PRINTED LAMINATED GLASS PANES

The invention relates to an improved color paste for use in the manufacture of internally printed, curved laminated glass panes, as used especially for motor vehicles. Other objects of the invention relate to a print medium, which is contained in the color paste, and the application of the color paste for manufacturing internally printed, curved laminated glass panes.

Laminated glass panes, in particular those for automobiles, comprise two glass panes, viz. an internal pane and an external pane and a plastic sheet inbetween, for example, one made of polyvinyl butyrate. Singly curved or doubly curved laminated glass panes are used especially for the windshield and rear windows or backlights of motor vehicles. A paint film in the form of an enamel is applied on places provided for this purpose on at least one of the panes. This paint film serves to cover glue spots or internal components of the vehicle, such as attachments of antennas and window heaters. It is expected from the paint film that it is adequately contoured and provides adequate coverage and exhibits the desired tint. The paint film must survive the service life of the laminated glass pane and it may not change nor peel from the glass pane.

To produce the paint film, a color paste is printed by a well-known method on the intended spots of a pane and is baked in a suitable manners. The color paste comprises in essence as colorant, inorganic components, such as inorganic pigments and/or color frits; a flux, which can also be a mixture of several fluxes, and a medium, which is usually called the print medium with respect to the most current application. Conventional print mediums comprise as essential components one or more solvents, a polymeric organic binder and diverse processing agents. The flux serves to fix the coloring components on the surface to be decorated. Flux, coloring components and print medium are intensively homogenized into a mixture such that there results a paste that can be printed and is easy to bake. The color paste for producing internally printed laminated glass panes is normally applied by screen printing. Following printing, the solvent is removed in a drying process. Subsequently other prints can be applied, for example, a print using so-called silver pastes to produce an electric circuit. Following the drying process, firing takes place in a furnace, where organic components of the color paste are burned and the vitrifying components are melted out and the pigment is fixed on the glass.

To produce curved laminated glass panes, the internal and external panes are laid on top of each other, heated to deformation temperature and the pair is curved using a bending template. The curved panes of the pair are then separated and, after a plastic sheet is embedded, compressed while heating. The described process cannot be carried out satisfactorily without additional measures, if one of the glass panes was coated with an enamel paint.

JP-A 62-72548 is based on a process for producing internally printed curved laminated glass panes. After imprinting a glass pane with a conventional enamel paste, the solvent is removed by drying and subsequently the glass pane that is thus decorated is fired without deformation at baking temperatures around 550° C., until no more carbon is left in the paint. Subsequently the second pane is laid on the imprinted pane and the pair is curved in the furnace at a deformation temperature of from above 550° up to about 650° C. The drawback with this process is that the pre-firing of the glass can produce optical distortions and a second firing is quite expensive. If one dispenses with the firing of the imprinted first pane and fires directly the internally printed pair, the oxygen required to burn the binder can no longer be supplied in sufficient amounts to the enamel, so that the result is reductive carbon, which reduces the metal oxide in the enamel paint and thus results in a poor adhesion of the enamel on the glass and also results in an undesired discoloration of the enamel.

In EP-A 0 535 474 the aforementioned drawback is circumvented by using a special enamel paint. This enamel paint contains an inorganic binder from the group of silicic-acid esters and preferably additionally inorganic oxygen donators, such as lead dioxide and manganese dioxide. The imprinted pane is dried at temperatures around 300° C. Subsequently the enamel is baked in the laminated pair while simultaneously deforming the laminated glass panes. The drawback with this process is that the color paste to be used exhibits only a low stability in storage; and in addition, following the imprinting, a drying step is necessary at a temperature usually around 250° C.

The object of the present invention is to provide a ceramic color paste, which is adequately stable in storage, does not require any complicated pre-drying of the imprinted pane and can be baked while the laminated pair is being deformed.

There has been found a color paste for producing internally printed, curved laminated glass panes, containing a flux; as colorant, inorganic components from the group of pigments and/or color frits that are stable to baking; and an organic solvent-containing print medium, characterized in that the print medium contains 5,6,8-trihydroxy-1,4-naphthoquinone in a quantity of 5 to 70% by weight.

The color paste contains as essential components 40 to 90% by weight of flux, which can also be a mixture of several fluxes; 5 to 60% by weight, in particular 15 to 40% by weight, of one or several pigments; and 5 to 60% by weight of a print medium and exhibits a printable consistency. "Printable" in this respect means that the color paste can be used without any problems when employing the conventional screen printing methods. Besides the aforementioned main components, the color paste can also contain conventional processing aids, for example viscosity regulators, in small quantities, in general less than altogether 5% by weight. The expert will adjust the optimal mixing ratio of the components of the color paste as a function of the desired color properties and working properties of the printed glass pane.

Suitable fluxes are in particular glass frits. Preferably such frits are used that can be baked at the deformation temperature of the laminated glass pane, thus between about 500° and 700° C. The glass frits can be in part or totally the so-called color frits, that is, those that contain coloring components. Suitable pigments are the customary inorganic pigments, which are stable under the baking conditions.

The print medium contained in the color paste contains the component according to the invention, viz., 5,6,8-trihydroxy-1,4-naphthoquinone, in a quantity ranging from 5 to 70% by weight, preferably from 10 to 50% by weight and especially 15 to 50% by weight. Furthermore, the print medium contains one or more organic solvents in a quantity ranging from 40 to 90% by weight, preferably 50 to 80% by weight. Organic solvents are adequately polar solvents which can clearly dissolve the 5,6,8-trihydroxy-1,4-naphthoquinone in the requisite amount. Suitable are, for example, solvents from the group of aromatic hydrocarbons, esters, glycols, glycol ethers, glycol esters and cycloaliphatic alcohols, such as terpene alcohols. Quite suitable are also glycol ether acetates, such as monobutyl ether monoacetate. In addition to the solvent and the naphthoquinone according to the invention, the print medium can contain up to 5% by weight, preferably up to 3% by weight, of one or more polymeric, organic binders. The polymeric binders serve to increase the handling properties of the enamel that is not yet baked. Suitable binders can be chosen from the group of polyacrylates, polymethacrylates, cellulose ethers and cellulose esters, polyvinyl butyrate and alkyd resins and urethane resins. Provided a polymeric binder is present, its content in the print medium ranges in general from 0.1 to 3% by weight, preferably from 0.1 to 2% by weight.

It has been found that the 5,6,8-trihydroxy-1,4-naphthoquinone, which is essential to the invention forms a print medium, which is quite suitable for producing color pastes, in the presence of a solvent. Said naphthoquinone is characterized in that it volatilizes both under air and under inert atmosphere up to about 290° C. It is not ruled out that this volatilization is coupled with a decomposition. Surprisingly said naphthoquinone exerts an adequate binding and/or antisedimentation effect, so that the color pastes produced thus are stable in storage. The volatilizability, which is possible even in the absence of oxygen, makes this substance especially suitable as an essential component in the color pastes and print mediums according to the invention. Since no oxygen is necessary for volatilizing said naphthoquinone, the problems which existed to date while firing internally imprinted laminated glass panes also are eliminated with the use of the color pastes and print mediums according to the invention. In contrast to the prior art color pastes, the use of the color pastes according to the invention results in a trouble-free burning, whereby no discoloration can be determined, no cracks or hole formation occurs and good adhesion on the glass pane is obtained.

Another special advantage of the color pastes according to the invention lies in the fact that the glass pane imprinted with this color paste can be dried under conventional production conditions, thus at a temperature in general below 150° C.

EXAMPLE 1

Preparation of the Print Mediums

Solvent and 5,6,8-trihydroxy-1,4-naphthoquinone (THNQ) are mixed, during which process the latter dissolves. Provided binders are added, said binders are dissolved in the solvent prior to the addition of the THNQ. The table shows the composition of the print medium (data in % by weight).

|  | A | B | C | D | E |
|---|---|---|---|---|---|
| THNQ | 50 | 30 | 20 | 19 | 19.5 |
| Butylcarbitolacetate | 50 | 70 | 80 |  |  |
| Pine Oil |  |  |  | 80 | 80 |
| Ethyl Cellulose |  |  |  | 1.0 |  |
| Polymethylmethacrylate |  |  |  |  | 0.5 |

EXAMPLES 2 TO 6

Color pastes: The preparation is according to the well-known method in a three roll mill. A lead borosilicate is used as the glass frit; a copper chrome spinel is used as the pigment; the color frit contained as the coloring oxides $Fe_2O_3$, MnO, CaO. The table shows the composition (in % by weight).

|  | Components | | | | |
|---|---|---|---|---|---|
|  | 2 | 3 | 4 | 5 | 6 |
| Medium 1A | 15 |  |  |  |  |
| Medium 1B |  | 19 |  |  |  |
| Medium 1C |  |  | 15 |  |  |
| Medium 1D |  |  |  | 15 |  |
| Medium 1E |  |  |  |  | 15 |
| Pigment | 21 | 41 | 25 | 30 | 35 |
| Glass Frit | 64 | 40 | 60 |  | 50 |
| Color Frit |  |  |  | 55 |  |

The color pastes were printed by means of screen printing; the solvent was removed by evaporation at 135° C. Following application of the second layer (sodium sulfate) that was provided in the known manner with a parting agent, the laminated glass pane was baked at 610° C. None of the paint enamel showed any formation of bubbles, holes, or cracks or optical distortions or discolorations; all of them showed good adhesion and adequate handling.

What is claimed is:

1. In a color paste for use in the manufacture of internally printed, curved laminated glass panes, comprising a flux; as colorant an inorganic component selected from the group consisting of a pigment, a color frit and mixtures thereof, which are stable to baking; and an organic solvent-containing print medium, the improvement wherein the print medium contains 5,6,8-trihydroxy-1,4-naphthoquinone in an amount of 5 to 70% by weight.

2. A color paste as claimed in claim 1, which contains 40 to 90% by weight of flux, 5 to 60% by weight of pigments, and 5 to 60% by weight of a print medium and exhibits a printable consistency.

3. A color paste as claimed in claim 1 or claim 2, wherein the print medium contains 10 to 60% by weight of 5,6,8-trihydroxy-1,4-naphthoquinone, 40 to 90% by weight of at least one organic solvent, and 0 to 5% by weight of a polymeric organic binder.

4. A color paste as claimed in claim 1 or claim 2, wherein the solvent of the print medium is selected from the group consisting of terpene alcohols, glycol ether acetates, and mixtures thereof.

5. A color paste as claimed in claim 3, wherein the solvent of the print medium is selected from the group consisting of terpene alcohols, glycol ether acetates, and mixtures thereof.

6. A color paste as claimed in claim 1 or claim 2, wherein the print medium contains 1 to 3% by weight of one or more binders selected from the group consisting of polyacrylates, polymethacrylates, cellulose ether and cellulose ester, and polyvinyl butyrates.

7. A color paste as claimed in claim 3, wherein the print medium contains 1 to 3% by weight of one or more binders selected from the group consisting of polyacrylates, polymethacrylates, cellulose ether and cellulose ester, and polyvinyl butyrates.

8. A color paste as claimed in claim 4, wherein the print medium contains 1 to 3% by weight of one or more binders selected from the group consisting of polyacrylates, polymethacrylates, cellulose ether and cellulose ester, and polyvinyl butyrates.

9. In a print medium for use in preparing a color paste, said print medium comprising an organic solvent, the improvement wherein the print medium contains 5,6,8-trihydroxy-1,4-naphthoquinone in an amount of 5 to 70% by weight.

10. A print medium as claimed in claim 9, comprising 10 to 60% by weight of 5,6,8-trihydroxy-1,4-naphthoquinone, 40 to 90% by weight of at least one organic solvent for the 5,6,8-trihydroxy-1,4-naphthoquinone, and 0 to 5% by weight of at least one polymeric organic binder.

* * * * *